United States Patent

Gagliardi et al.

[11] Patent Number: 5,955,130
[45] Date of Patent: Sep. 21, 1999

[54] PROCESS FOR PREPARING DEHYDRATED VEGETABLES

[75] Inventors: Vittorio Gagliardi; Sandro Panaioli, both of Rome, Italy

[73] Assignee: Unilever Patent Holdings B.V., Vlaardingen, Netherlands

[21] Appl. No.: 08/881,148

[22] Filed: Jun. 24, 1997

Related U.S. Application Data

[62] Division of application No. 08/520,926, Aug. 30, 1995, abandoned.

[30] Foreign Application Priority Data

Aug. 30, 1994 [EP] European Pat. Off. ............ 94830410

[51] Int. Cl.⁶ ................ A23L 1/025; A23L 1/20
[52] U.S. Cl. ............ 426/241; 426/243; 426/510; 426/456
[58] Field of Search ................. 426/243, 510, 426/456, 466, 242, 511, 241

[56] References Cited

U.S. PATENT DOCUMENTS

| | | | |
|---|---|---|---|
| 3,649,305 | 3/1972 | Wilder | 426/241 |
| 4,361,589 | 11/1982 | Wauters et al. | 426/640 X |
| 4,447,460 | 5/1984 | Lewis et al. | 426/640 X |
| 4,614,660 | 9/1986 | Weibye | 426/461 |
| 4,676,990 | 6/1987 | Huffman et al. | 426/640 X |
| 4,683,141 | 7/1987 | Lewis et al. | 426/640 X |
| 4,731,251 | 3/1988 | Jovanovic | 426/243 |
| 4,735,816 | 4/1988 | Sterner et al. | 426/510 X |
| 4,800,090 | 1/1989 | August | 426/243 |
| 4,919,965 | 4/1990 | Childers | 426/615 |
| 5,202,139 | 4/1993 | Gaon et al. | 426/242 |
| 5,292,540 | 3/1994 | Laufer | 426/242 |
| 5,441,758 | 8/1995 | Lewis et al. | 426/466 X |
| 5,747,087 | 5/1998 | Fosbol et al. | 426/242 |

FOREIGN PATENT DOCUMENTS

| | | | |
|---|---|---|---|
| 860263 | 1/1971 | Canada | 426/640 |
| 0 498 972A1 | 8/1992 | European Pat. Off. | |
| 3443218 | 5/1986 | Germany | 426/242 |
| 1-101 846 | 4/1989 | Japan . | |
| 2-16939 | 1/1990 | Japan | 426/243 |
| WO 83/00802 | 3/1983 | WIPO . | |

OTHER PUBLICATIONS

JP-A-63 304 941, English Abstract Only.
Abstracts for EP 582 922; EP 376 275; SU 1353408; GB 2026297l; DE 2110350; and US 5151285.

*Primary Examiner*—Arthur L. Corbin
*Attorney, Agent, or Firm*—Pillsbury, Madison & Sutro LLP

[57] ABSTRACT

A dehydrated vegetable product is obtained by:
- (a) flash blanching a vegetable in about 100% saturated steam;
- (b) steam cooking the vegetable in 35 to 65% saturated steam; and
- (c) cooking the vegetable by exposure to infra-red radiation for from 1.5 to 6.0 minutes.

This dehydrated vegetable product is particularly useful as a binder in complex moulded products and as a filling or topping component.

9 Claims, No Drawings

PROCESS FOR PREPARING DEHYDRATED VEGETABLES

This is a division of application Ser. No. 08/520,926, filed on Aug. 30, 1995 which was abandoned upon the filing hereof.

FIELD OF THE INVENTION

The invention relates to a dehydrated vegetable product, a process for its manufacture and its use in moulded products and as a filling or topping component.

BACKGROUND OF THE INVENTION

It is desirable to manufacture dehydrated vegetables having excellent taste and texture properties. Such dehydrated vegetables may for example be used as a filling or topping component in food products such as pies, pizza, flans and snackfoods.

It is a common problem with such filled food products that the moisture content of the filling component adversely affects the casing or base component of the food product during storage via moisture migration into the casing or base.

However conventional dehydrated vegetables are not a suitable alternative to fresh vegetables for use as the filling component because conventional dehydrated vegetables have undesirable taste and texture properties and require rehydration prior to use.

Furthermore it is desirable to be able to produce accurately moulded complex shaped vegetable products (eg. 3D shaped products and products having complex geometrical shapes). However such products have not been possible to date without the addition of an edible glue, eg. starch. Such glues have a detrimental effect on the product quality.

We have been able to solve the above-mentioned problems by producing dehydrated vegetables having excellent taste and texture properties. Such dehydrated vegetable may advantageously be used as a filling component or as a binder in moulded products. JP1-101846 describes a method of manufacturing a dried potato snack food: the potato portions are steamed for 15 seconds; dehydrated using a far infra-red (5.8–1000 micron wavelength) drying unit for 35 mintues; and crisped on the surface by near infra-red heaters for 1 minute. The long exposure to far infra-red radiation for 35 minutes results in a substantially dehydrated potato portion which is suitable for a snack food, but is not suitable as a filling component or as a binder in moulded products.

SUMMARY OF THE INVENTION

In contrast, the present invention seeks to provide a dehydrated vegetable which has a sufficiently high water content to be used as a filling component or as a binder in moulded products. In part, this is effected by a relatively short exposure to infra-red radiation.

Accordingly, the present invention provides a dehydrated vegetable obtainable by
 (a) flash blanching a vegetable in up to 100% saturated steam;
 (b) steam cooking the vegetable in 35 to 65% saturated steam; and
 (c) cooking the vegetable by exposure to infra-red raditation for from 1.5 to 6.0 minutes.

The invention further provides a process for preparing dehydrated vegetables comprising the steps of:
 (a) flash blanching vegetables in up to 100% saturated steam;
 (b) steam cooking vegetables in 35 to 65% saturated steam; and
 (c) cooking vegetables by exposure to infra-red cooking for from 1.5 to 6.0 minutes.

The invention further provides the use of the dehydrated vegetable as a binder in complex-shaped moulded products and as a filling or topping component in a food product.

DESCRIPTION OF PREFERRED EMBODIMENTS

Preferably the dehydrated vegetable is produced by a process wherein the steps (a) and (b) described above are carried out for approximately equal times.

Suitably the flash blanching is conducted at a temperature of from 100–300° C. for approximately 60 to 180 seconds, and typically the steam cooking is conducted at a temperature of from 200 to 300° C. for approximately 60 to 180 seconds.

Preferably the steam cooking is conducted in approximately 50% saturated steam.

Optionally, the vegetables are heated to up to 95° C. by exposure to microwave radiation prior to the step of flash blanching, and preferably for up to 90 seconds.

The precise flash blanching conditions and steam cooking conditions to be used will, of course, depend on the size of the vegetable piece being processed and the vegetable type.

The infra-red cooking is preferably conducted using a direct $CH_4$ gas flame having a temperature of 500–600° C. This typically provides an air temperature of from 240–350° C. and a band temperature of 100–170° C. However, an indirect $CH_4$ gas flame may also be used having a temperature of from 800 to 900° C. Infra-red cooking is suitably carried out for approximately from 1.5 to 6 minutes and with a wavelength of approximately from 3.5 to 4.5 microns.

The optional microwave heating step preferably raises the temperature of the vegetables to 95° C., by exposure to microwave radiation of 2450 MhZ for less than 90 seconds, in preparation for the flash blanching step. This cooks the vegetables more evenly, so the flash blanching is more effective.

Suitable vegetables for dehydration according to the invention include zucchini, peppers, mushrooms, potatoes, cauliflower, onions, artichokes and aubergines.

The vegetables lose approx 30 to 60% of their water content depending on the vegetable by being subjected to this dehydration process. Thus, they are effectively baked, as opposed to being substantially dehydrated.

Dehydrated vegetables according to the invention may be used as a filling or topping component in food products such as flans, pizza, pies and snack foods.

Dehydrated vegetables, and in particular dehydrated potato, according to the invention may be used as a binder in complex shaped moulded food products.

An example of an advantageous shape for such complex moulded food products is a three-dimensional ring shape because this permits homogeneous cooking of the food product, ie. the food at the outside of the product is not cooked substantially more than the food located in the centre of the food product.

Such moulded food products may be made by one of the following processes.

Process 1 i) preparation of dehydrated potato as described above;
ii) shredding the dehydrated potato at −7 to −10° C. to obtain a "potato snow";
iii) mixing the "potato snow" with the other ingredients; and
iv) moulding the mixture.

Process 2 a) preparation of dehydrated potato as described above;
b) mixing the dehydrated potato with the other ingredients in the presence of an innocuous refrigerant, for example carbon dioxide; and
c) moulding the mixture.

Preferably the mixing step is carried out in a gentle mixer, for example a Nauta-Mixer® (Hosokawa).

The moulding may be carried out in any suitable manner. For example the mixture (iii) obtained in process 1 may be poured into a hot mould for heat setting at approximately 150–250° C. for 3 to 6 minutes in a "waffle-like" procedure to produce a "pastry-like" casing.

Alternatively the vegetable mix obtained in either process 1 or 2 may be moulded in a shaped die under pressure. Preferably the moulding temperature is below 0° C., most preferably from −1° C. to −7° C.

EXAMPLES

Example 1
Preparation of Dehydrated Potato

Potatoes were washed and then blanched for 70 seconds in steam at 7.5 atmospheres before peeling and dicing into pieces having the dimensions of 22×20×16 mm.

The potato pieces were flash blanched for 80 seconds in 100% saturated steam in a jet stream oven at 200° C. The steam was delivered to the oven at a rate of 540 kg/h. The air speed in the oven was 17 m/s.

The potato pieces were next transferred into a second jet stream oven where they were steam cooked at 270° C. in approximately 50% saturated steam for 85 seconds. The steam was delivered to the oven at a rate of 540 kg/h. The air speed was from 17–25 m/s.

The potato pieces were then transferred to an Orlandi oven for infra-red cooking for approximately 5 minutes. The air temperature in the oven increased from 240° C. to 350° C. as the potato pieces progressed through the oven on a conveyor belt.

The potatoes lost approximately 50% of their water content by being subjected to this dehydration process.

Example 2
Preparation of Dehydrated Aubergine

Whole aubergines were washed and destalked before slicing into 10 mm thick slices. The aubergine slices were first flash blanched for 60 seconds in 100% saturated steam in a jet stream oven set at 300° C. The steam was delivered to the oven at a rate of 500 kg.h. The air speed in the oven was from 17–25 m/s.

The aubergine slices were next transferred into a second jet stream oven where they were steam cooked at 300° C. for 65 seconds. The steam was delivered to the oven at 500 kg/h. The air speed in the oven was 17 m/s.

The aubergine slices were then transferred to an Orlandi oven for infra-red cooking for 210 seconds. The air temperature in the oven increased from 250 to 340° C. as the aubergine slices progressed through the oven on a conveyor belt.

Example 3
Preparation of a Complex Moulded Product

Dehydrated potato was obtained by the process given in Example 1. The dehydrated potato was shredded into "potato snow" using a Comitrol machine (Urschel). The potato was inserted into the Comitrol machine at −20° C. and emerged at a temperature of −7° C.

The following ingredients were mixed together for 4 minutes. The temperature of the mixture after mixing was from −6 to −7° C.

|  | Kg |
| --- | --- |
| Peas | 15.0 |
| Carrots | 18.0 |
| Sweetcorn | 13.0 |
| "Potato Snow" | 63.0 |
| Potato powder | 10.5 |
| Egg yolk | 3.0 |
| Salt | 1.8 |
| Emmenthal cheese | 10.0 |
| Gruyere cheese | 9.0 |
| Bechamel | 6.0 |
| Nutmeg | 0.2 |

The mixture was formed into shapes having the dimensions 82×24×10 mm in a Marlen pump V670 forming machine at a pressure of 500 psi. The temperature of the final product was −4 to −5° C.

The product was then battered and crumbed in the conventional way and pre-fried in sunflower oil at 180° C. for 20 minutes before freezing and packaging.

We claim:

1. A process for preparing dehydrated vegetables for use in sauces, fillings, toppings and molded products comprising the steps of:

(a) flash blanching vegetables having a thickness of at least 10 mm in about 100% saturated steam;
   (b) steam cooking the flash blanched vegetables in 35 to 65% saturated steam; and then
   (c) cooking the steam cooked vegetables by exposure to infra-red radiation for from 1.5 to 6.0 minutes, wherein the vegetables lose approximately 30 to 60% by weight of their original water content and are suitable for use in sauces, fillings, toppings and molded products.

2. A process according to claim 1 wherein steps (a) and (b) are carried out for approximately equal times.

3. A process according to claim 2 wherein the flash blanching is conducted at a temperature of from 100–300° C. for 60 to 180 seconds.

4. A process according to claim 3 wherein the steam cooking is conducted at a temperature of from 200–300° C. for 60 to 180 seconds.

5. A process according to claim 4 wherein the infra-red cooking is conducted with an air temperature of from 240–350° C.

6. A process according to claim 5, wherein the vegetables are heated to up to 95° C. by exposure to microwave radiation prior to the step of flash blanching.

7. A process according to claim 6, wherein the vegetables are exposed to the microwave radiation for up to 90 seconds.

8. A process according to claim 7 wherein the vegetables are selected from zucchini, peppers, cauliflower, onion, artichokes, mushrooms, potatoes, aubergines and mixtures thereof.

9. A process according to claim 1 wherein the vegetables lose only 30–60% by weight of their original water content so that they are effectively baked.

* * * * *